united States Patent
Masuda et al.

(10) Patent No.: US 8,077,300 B2
(45) Date of Patent: Dec. 13, 2011

(54) MTF MEASURING SYSTEM, MTF MEASURING METHOD, MTF MEASURING UNIT AND MTF MEASURING PROGRAM

(75) Inventors: Takashi Masuda, Tokyo (JP); Kouki Yoshida, Tokyo (JP); Takaharu Aoki, Tokyo (JP); Kenichiro Waki, Tokyo (JP)

(73) Assignee: Acutelogic Corporation, Tokyo (JP)

( * ) Notice: Subject to any disclaimer, the term of this patent is extended or adjusted under 35 U.S.C. 154(b) by 313 days.

(21) Appl. No.: 12/376,600

(22) PCT Filed: Aug. 3, 2007

(86) PCT No.: PCT/JP2007/065670
§ 371 (c)(1),
(2), (4) Date: Feb. 6, 2009

(87) PCT Pub. No.: WO2008/018573
PCT Pub. Date: Feb. 14, 2008

(65) Prior Publication Data
US 2010/0177303 A1 Jul. 15, 2010

(30) Foreign Application Priority Data

Aug. 7, 2006 (JP) ................................. 2006-214437

(51) Int. Cl.
*G01B 9/00* (2006.01)
(52) U.S. Cl. ...................................................... 356/124

(58) Field of Classification Search .................. None
See application file for complete search history.

(56) References Cited

U.S. PATENT DOCUMENTS 5,923,416 A 7/1999 Rosow et al.
2006/0067663 A1* 3/2006 Kita ............................... 396/72

FOREIGN PATENT DOCUMENTS

| JP | 56-2519 A | 1/1981 |
| JP | 2000-511288 A | 8/2000 |
| JP | 2002-350285 A | 12/2002 |
| JP | 2003-185531 A | 7/2003 |
| JP | 2004-132703 A | 4/2004 |

* cited by examiner

*Primary Examiner* — Tu Nguyen
(74) *Attorney, Agent, or Firm* — Smith Patent Office

(57) ABSTRACT

A MTF measuring system includes measurement result screen data indicative of an object image and an MTF curve image are generated in accordance with the object image data obtained by photographing the object and the MTF curve image data indicative of the MTF curve generated from MTF data that become an index to evaluate lens performance. The measurement result screen based on the generated measurement result screen data is displayed on a real time basis in the case of evaluation measurement operations of the lens performance. A user can grasp the necessity for a focus adjustment from the MTF curve image on the measurement result screen. If necessary, the user can adjust the focus of the object displayed together with the MTF curve image, and at the same time can evaluate the lens performance from the MTF curve image.

1 Claim, 12 Drawing Sheets

US 8,077,300 B2

MTF MEASURING SYSTEM, MTF MEASURING METHOD, MTF MEASURING UNIT AND MTF MEASURING PROGRAM

TECHNICAL FIELD

The present invention relates to an MTF measuring system, an MTF measuring method, an MTF measuring unit and an MTF measuring program, and more particularly to a system for measuring an MTF representing, as a spatial frequency characteristic, an extent at which a contrast possessed by an object can be faithfully reproduced, and a method of measuring the same.

BACKGROUND ART

Indices for evaluating a lens performance include an MTF (Modulation Transfer Function). The MTF represents, as a spatial frequency characteristic, an extent at which a contrast possessed by an object can be faithfully reproduced to know a lens performance. The spatial frequency indicates the number of patterns included per [mm]. In a so-called MTF curve, an axis of abscissas indicates the spatial frequency and an axis of ordinates indicates a value of the contrast.

There has been known an MTF measuring system for evaluating a lens performance by utilizing an MTF curve (for example, see Patent Document 1). The Patent Document 1 has disclosed an MTF measuring system for calculating an MTF to be an index for evaluating a lens performance to acquire MTF data based on object image data obtained by photographing an object through a lens, and evaluating the lens performance through an MTF curve represented by MTF curve image data generated from the MTF data.

Patent Document 1: Japanese Laid-Open Patent Publication No. 2002-350285

DISCLOSURE OF THE INVENTION

However, the MTF measuring system has the following problem to be solved. More specifically, in the case in which a work for evaluating a lens performance is carried out, a user first refers to an object image represented by object image data acquired by photographing an object through the MTF measuring system and carries out an alignment of the object and focusing. Then, the MTF measuring system receiving a measuring start instruction or the like from the user calculates an MTF to acquire MTF data based on the object image data adjusted by the user and generates MTF curve image data based on the MTF data. Then, the user evaluates the lens performance based on an MTF curve represented by the MTF curve image data thus generated. In order to carry out the work for evaluating the lens performance, thus, the serial work is required. For this reason, there is a problem in that the work for evaluating and measuring the lens performance cannot be efficiently carried out.

In order to solve the problem, it is an object of the present invention to enable the work for evaluating and measuring the lens performance to be efficiently carried out.

In order to attain the object, in the present invention, measuring result screen data indicative of an object image and an MTF curve image are generated based on object image data acquired by photographing an object and MTF curve image data indicative of an MTF curve which are generated from MTF data to be an index for evaluating a lens performance and a measuring result screen based on the measuring result screen data thus generated is displayed on a display portion.

According to the present invention having the structure described above, the measuring result screen indicative of the object image and the MTF curve image is displayed on a real-time basis in the work for evaluating and measuring the lens performance. Therefore, the user can grasp the necessity of focusing from the MTF curve image of the measuring result screen to adjust a focus of the object image displayed together with the MTF curve image if necessary, and at the same time, can also evaluate the lens performance based on the MTF curve image. Accordingly, it is possible to enhance an efficiency of the work for evaluating and measuring the lens performance.

BEST MODE FOR CARRYING OUT THE INVENTION

Figure 1:
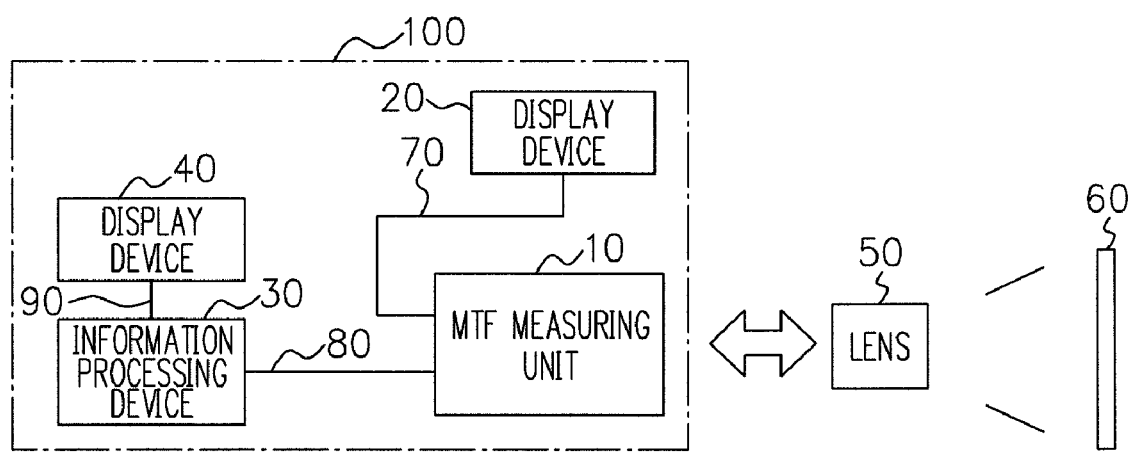
FIG. 1 is a diagram showing an example of a whole structure of an MTF measuring system according to a first embodiment.

A first embodiment according to the present invention will be described below in detail with reference to the drawings. FIG. 1 is a diagram showing an example of a whole structure of an MTF measuring system 100 according to the first embodiment. As shown in FIG. 1, the MTF measuring system 100 according to the first embodiment includes an MTF measuring unit 10, a display device 20, an information processing device 30 and a display device 40.

Figure 3:
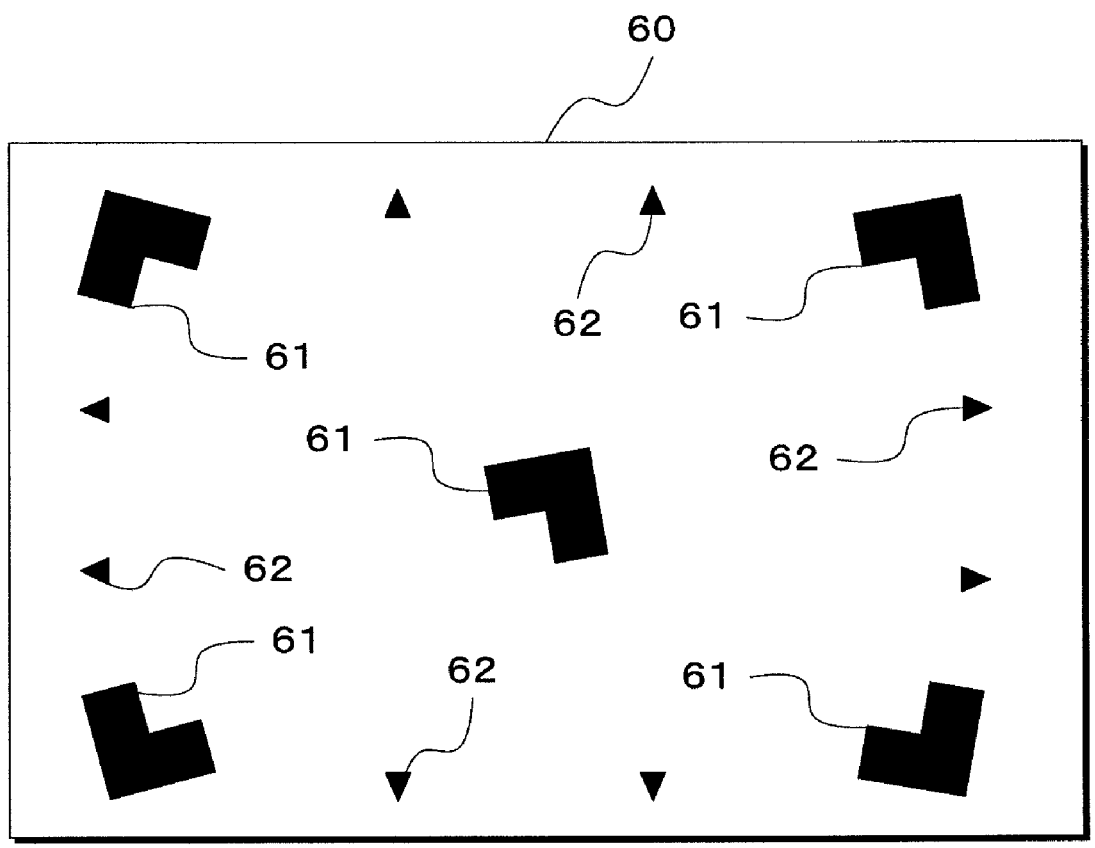
FIG. 3 is a view showing an example of a chart according to the first embodiment and a second embodiment.

A lens 50 in FIG. 1 serves as a performance evaluating target and can be attached to and removed from the MTF measuring unit 10. A chart 60 is an object to be photographed for calculating an MTF serving as an index for evaluating a lens performance, and has L-shaped markers 61 printed in five parts in total which include a central part and peripheral parts thereof and a plurality of positioning marks 62 printed in positions on respective sides of a virtual rectangle with the L-shaped markers 61 in four peripheral parts set to be four corners as shown in FIG. 3.

The MTF measuring unit 10 serves to carry out a calculation of an MTF of the attached lens 50 or the like in order to evaluate a performance of the lens 50, and is connected to the display device 20 through an AV (Audio Visual) cable 70. Moreover, the MTF measuring unit 10 is connected to the information processing device 30 through an LAN (Local Area Network) cable 80. The display device 20 is a video monitor constituted by a liquid crystal or the like, and displays a measuring result screen indicative of an object image and an MTF curve image as will be described below.

The information processing device 30 is a PC (Personal Computer) for storing MTF data, controlling a display of the MTF curve image, or the like, and is connected to the display device 40 through a VGA (Video Graphics Array) cable 90. Although the information processing device 30 and the display device 40 are connected to each other through the VGA cable 90 in the first embodiment, this is not restricted. It is also possible to employ any member capable of connecting both of the devices, for example, a USB (Universal Serial Bus) cable or the like. The display device 40 is a PC monitor constituted by a liquid crystal or the like, and displays an MTF curve screen indicative of an MTF curve as will be described below.

Figure 2:
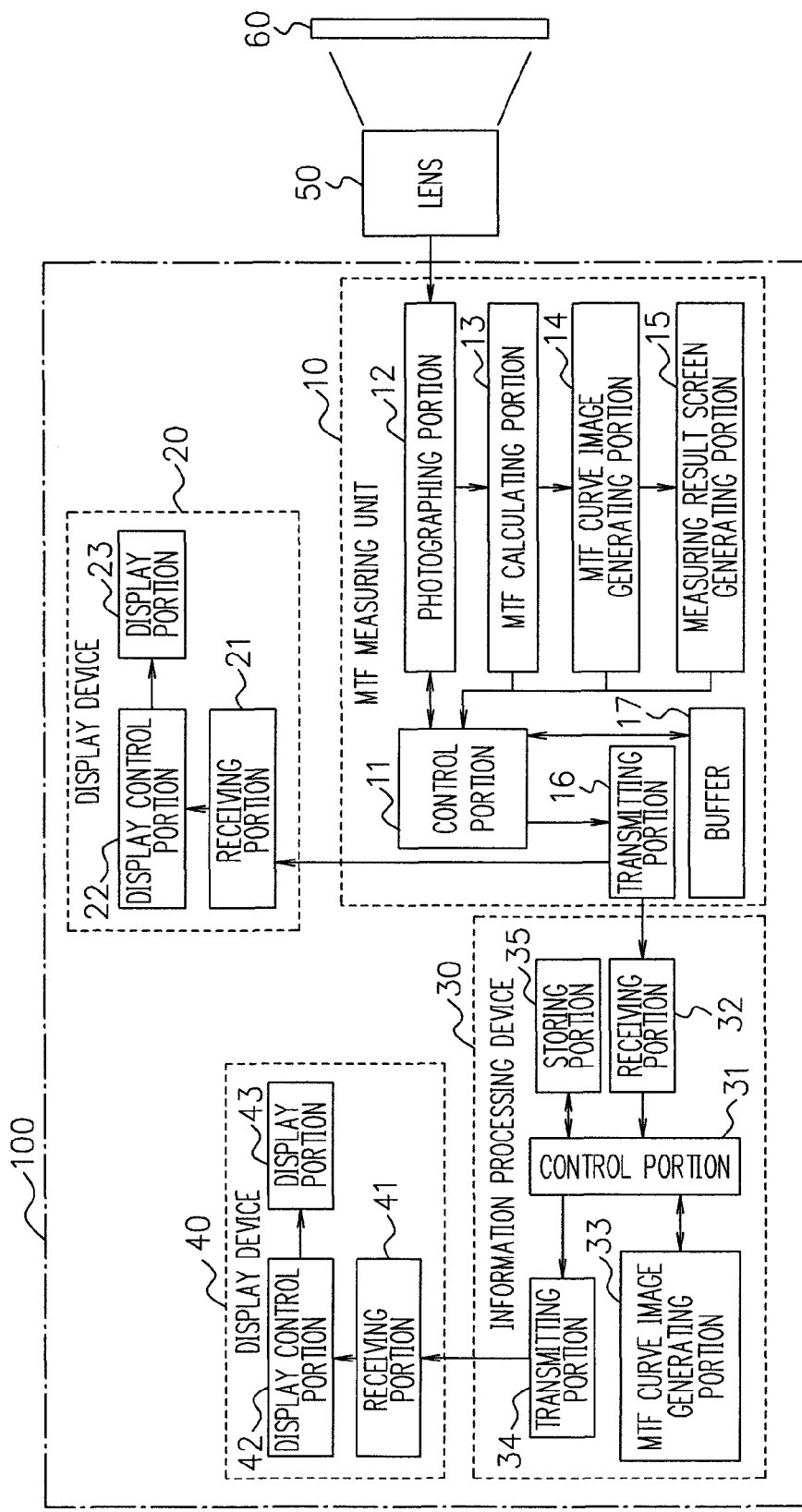
FIG. 2 is a block diagram showing an example of a functional structure of the MTF measuring system according to the first embodiment.

FIG. 2 is a block diagram showing an example of a functional structure of the MTF measuring system 100 according to the first embodiment. As shown in FIG. 2, the MTF measuring unit 100 includes a control portion 11, a photographing portion 12, an MTF calculating portion 13, an MTF curve image generating portion 14, a measuring result screen generating portion 15, a transmitting portion 16, and a buffer 17.

As will be described below, the buffer 17 temporarily holds object image data acquired by the photographing portion 12, MTF data acquired by the MTF calculating portion 13, MTF curve image data generated by the MTF curve image generating portion 14, and measuring result screen data generated by the measuring result screen generating portion 15.

The control portion 11 serves as a so-called CPU to generalize and control the MTF measuring unit 10. For example, upon receipt of an evaluating start signal for giving an instruction for starting a performance evaluation from the information processing device 30 in order to evaluate the performance of the lens 50, a photographing start signal for giving an instruction for starting to photograph the chart 60 is output to the photographing portion 12. Moreover, the control portion 11 outputs, to the transmitting portion 16, the MTF data acquired by the MTF calculating portion 13 and the measuring result screen data generated by the measuring result screen generating portion 15 as will be described below.

The photographing portion 12 is constituted by a CCD (Charge Coupled Device) or the like to photograph the chart 60 acting as an object. The photographing portion 12 has a lens bonding portion which is not shown, for example, and the lens 50 is rotated and is screwed and attached into the lens bonding portion. The lens 50 is provided with an operating portion for focusing. A user can carry out the focusing by manipulating the operating portion of the lens 50. Moreover, it is also possible to carry out the focusing for the lens 50 attached to the lens bonding portion corresponding to an instruction for change which is given from the information processing device 30, for example. Upon receipt of the photographing start signal from the control portion 11, furthermore, the photographing portion 12 starts to photograph the chart 60 through the lens 50 which is attached, thereby acquiring object image data. The object image data thus acquired are temporarily held in the buffer 17 by the control portion 11. Subsequently, the chart 60 is continuously photographed until a photographing end signal for giving an instruction to end the photographing operation is received from the control portion 11.

The MTF calculating portion 13 calculates an MTF to be an evaluation index for the lens performance. When the photographing portion 12 acquires the object image data, the MTF calculating portion 13 calculates the MTF by using the same MTF measuring method as a conventional MTF measuring method determined by the ISO (International Organization for Standardization) 12233, for example, based on the acquired object image data and measuring position data indicative of a measuring position on a preset object image, thereby acquiring MTF data. The MTF data thus acquired are temporarily held in the buffer 17 by the control portion 11.

In the first embodiment, measuring position data setting, as targets, the L-shaped marks in five parts (the central part of the chart 60 and four peripheral parts thereof) printed on the chart 60 are preset to the MTF calculating portion 13. The MTF calculating portion 13 calculates the MTFs for the L-shaped marks in the five parts respectively based on the measuring position data and the object image data, thereby acquiring five MTF data.

Although the MTF is not restrictively calculated for the five parts according to the first embodiment, it is preferable to set the five parts shown in FIG. 3 to be measuring positions. More specifically, as described above, the MTFs are calculated for the L-shaped marks in the five parts distributed and disposed in the chart 60 respectively so that the user can refer to each MTF curve image in each of the measuring positions in the five parts together with an object image through the measuring result screen as will be described below. Accordingly, the user can grasp the necessity of the focusing in peripheral parts of an image photographed through the lens 50 in addition to a central part thereof based on an MTF curve in each measuring position and can carry out the focusing if necessary, thereby performing the focusing in more detail.

The MTF curve image generating portion 14 generates the MTF curve image data indicative of the MTF curve based on the MTF data. When the MTF calculating portion 13 acquires the MTF data, the MTF curve image generating portion 14 generates, based on the MTF data thus acquired, the MTF curve image data in which an axis of abscissas indicates a spatial frequency and an axis of ordinates indicates a value of a contrast. The MTF curve image data thus generated are temporarily held in the buffer 17 through the control portion 11. In the first embodiment, the MTF calculating portion 13 acquires five MTF data so that the MTF curve image generating portion 14 generates five MTF curve image data corresponding to the respective MTF data.

The measuring result screen generating portion 15 generates measuring result screen data indicative of an object image and an MTF curve image. When the MTF curve image generating portion 14 generates the MTF curve image data, the measuring result screen generating portion 15 generates the measuring result screen data indicative of the object image and the MTF curve image based on the MTF curve image data and the object image data which are temporarily held in the buffer 17. The measuring result screen data thus generated are temporarily held in the buffer 17 by the control portion 11. In the first embodiment, the measuring result screen generating portion 15 generates measuring result screen data indicative of an object image and MTF curve images in five parts (the central part of the chart 60 and four peripheral parts thereof) based on the object image data and the five MTF curve image data.

The transmitting portion 16 transmits data to the display device 20 and the information processing device 30. Upon receipt of the measuring result screen data and the MTF data which are read from the buffer 17 by the control portion 11 respectively, the transmitting portion 16 transmits the measuring result screen data to the display device 20 and transmits the MTF data to the information processing device 30. In the first embodiment, the MTF calculating portion 13 acquires five MTF data. Therefore, the transmitting portion 16 transmits the five MTF data to the information processing device 30.

The display device 20 includes a receiving portion 21, a display control portion 22, and a display portion 23 such as a liquid crystal panel. The receiving portion 21 receives the measuring result screen data from the MTF measuring unit 10. The display control portion 22 controls a screen display for the display portion 23 and causes the display portion 23 to display the measuring result screen indicative of the object image and the MTF curve image based on the measuring result screen data.

Figure 6:
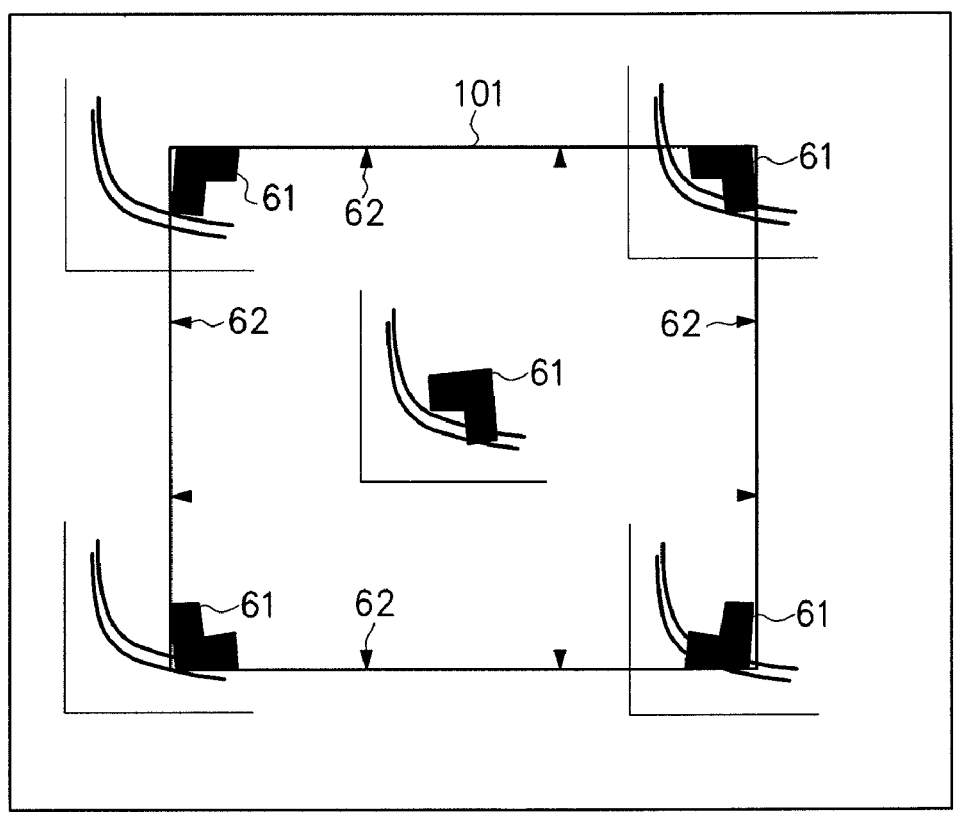
FIG. 6 is a view showing an example of the measuring result screen according to the first embodiment.

In the first embodiment, the display control portion 22 causes the display portion 23 to display a measuring result screen shown in FIG. 6. A rectangular frame 101 representing an MTF measuring position is displayed on a center of the measuring result screen, and the object image of the chart 60 is displayed in the rectangular frame 101. Moreover, corresponding MTF curve images are displayed in vicinal positions (a central part and four peripheral parts thereof) of the L-shaped marker 61 in which the MTF is measured over the object image, respectively. The user moves the chart 60 or the MTF measuring unit 10, thereby causing a plurality of positioning marks 62 included in the object image of the chart 60 to come in contact with respective sides of the rectangular frame 101 and thus adjusting the measuring position.

The information processing device 30 includes a control portion 31, a receiving portion 32, an MTF curve image generating portion 33 and a transmitting portion 34. The receiving portion 32 receives the MTF data from the MTF measuring unit 10. In the first embodiment, five MTF data are received.

The control portion 31 serves as a so-called CPU to generalize and control the information processing device 30, and outputs MTF data to the MTF curve image generating portion 33 when the receiving portion 32 receives the MTF data. In the first embodiment, five MTF data are output to the MTF curve image generating portion 33. Moreover, the control portion 31 outputs, to the transmitting portion 34, the MTF curve image data generated by the MTF curve image generating portion 33 as will be described below. In the first embodiment, the control portion 31 outputs the five MTF curve image data to the transmitting portion 34.

Furthermore, the control portion 31 stores, in the storing portion 35, the MTF curve image data generated by the MTF curve image generating portion 33. Upon receipt of a display instruction from the user through an input portion which is not shown or the like, the control portion 31 reads the MTF curve image data from the storing portion 35 and outputs the MTF curve image data thus read to the transmitting portion 34. Consequently, the user can display, on the display device 40, the MTF curve image data stored in the storing portion 35 to carry out a confirmation or the like at any time.

The MTF curve image generating portion 33 generates MTF curve image data indicative of an MTF curve based on the MTF data. Upon receipt of the MTF data from the control portion 31, the MTF curve image generating portion 33 generates MTF curve image data in which an axis of abscissas indicates a spatial frequency and an axis of ordinates indicates a value of a contrast based on the MTF data. In the first embodiment, the MTF curve image generating portion 33 generates five MTF curve image data corresponding to the respective MTF data because it receives the five MTF data from the control portion 31.

Upon receipt of the MTF curve image data generated by the MTF curve image generating portion 33 from the control portion 31, the transmitting portion 34 transmits the MTF curve image data to the display device 40. In the first embodiment, the MTF curve image generating portion 33 generates the five MTF curve image data respectively. Therefore, the transmitting portion 34 transmits, to the display device 40, the five MTF curve image data accepted from the control portion 31.

Figure 8:
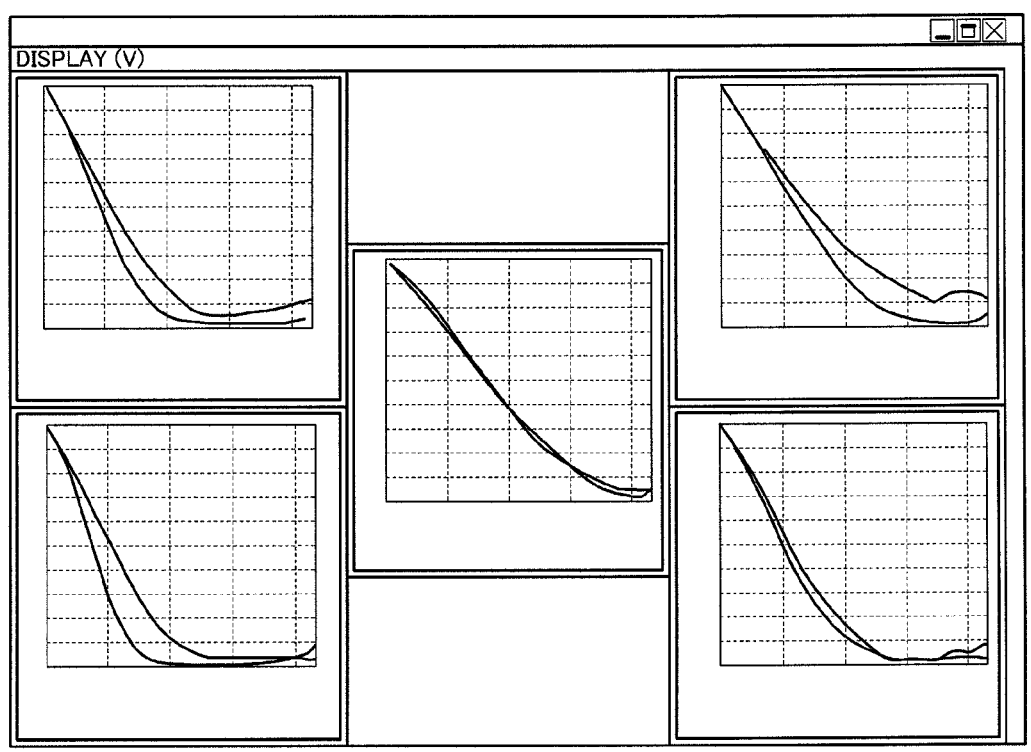
FIG. 8 is a view showing an example of the MTF curve screen according to the first embodiment.

The display device 40 includes a receiving portion 41, a display control portion 42 and a display portion 43 such as a liquid crystal panel. The receiving portion 41 receives the MTF curve image data from the information processing device 30. In the first embodiment, the receiving portion 41 receives the five MTF curve image data. The display control portion 42 controls a screen display for the display portion 43 and causes the display portion 43 to display the MTF curve screen indicative of the MTF curve image based on the MTF curve image data. In the first embodiment, an MTF curve screen indicative of the respective MTF curve images in positions (a central part and four peripheral parts thereof) in which the MTF is measured is displayed on the display portion 43 as shown in FIG. 8 based on the five MTF curve image data.

Figure 4:
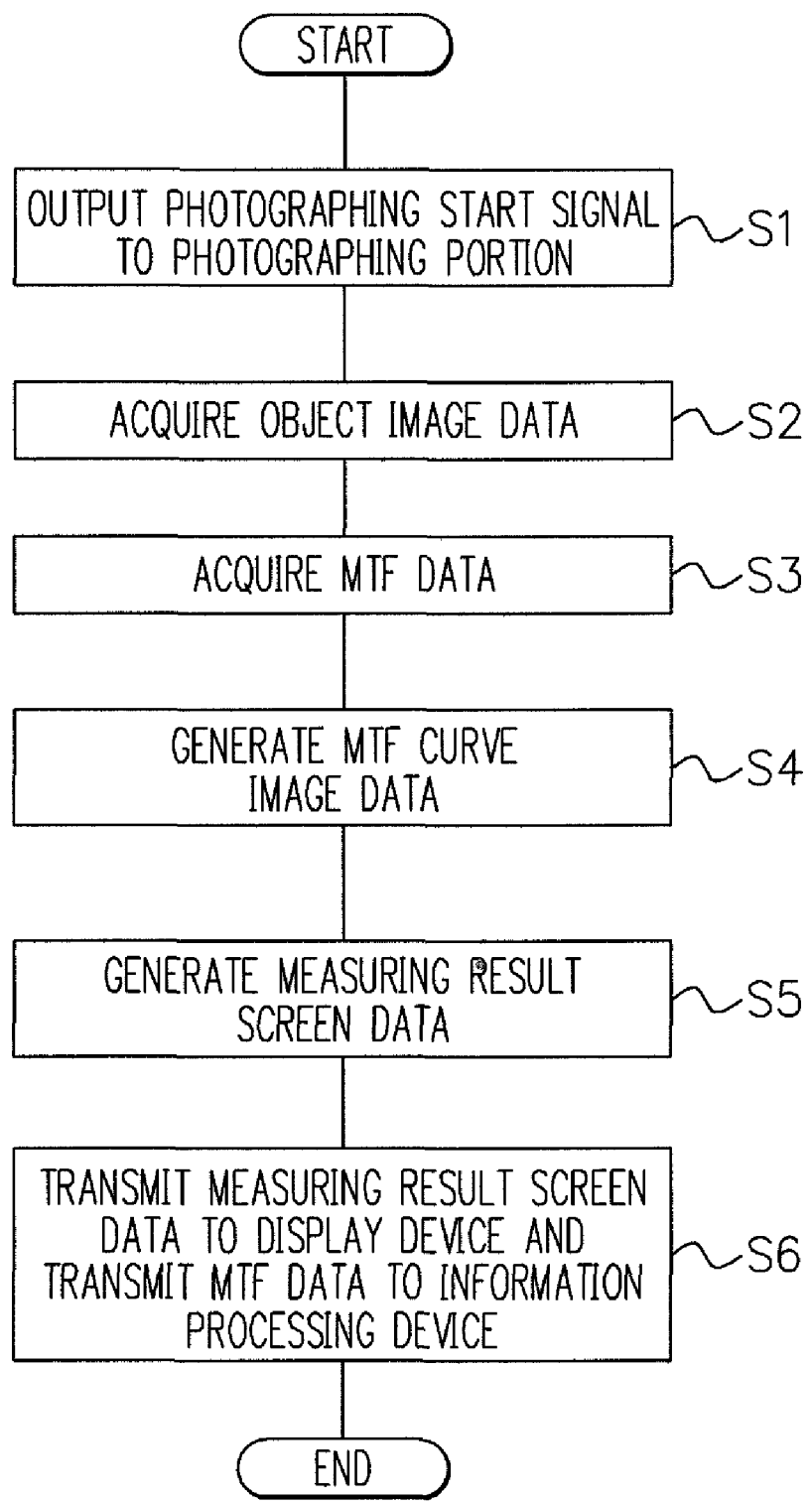
FIG. 4 is a flowchart showing an example of an operation of an MTF measuring unit according to the first embodiment.

Next, description will be given to an operation of the MTF measuring system 100 according to the first embodiment. First of all, description will be given to an operation to be carried out until the MTF measuring unit according to the first embodiment transmits the measuring result screen data to the display device 20 and transmits the MTF data to the information processing device 30. FIG. 4 is a flowchart showing an example of the operation of the MTF measuring unit 10 according to the first embodiment.

In FIG. 4, the control portion 11 of the MTF measuring unit 10 outputs, to the photographing portion 12, a photographing start signal for giving an instruction for starting to photograph the chart 60 upon receipt of an evaluating start signal for giving an instruction for starting the performance evaluation from the information processing device 30 in order to evaluate the performance of the lens 50, for example (Step S1).

Upon receipt of the photographing start signal, the photographing portion 12 starts to photograph the chart 60 through the attached lens 50, thereby acquiring object image data (Step S2). In this case, the photographing portion 12 outputs the object image data thus acquired to the control portion 11. The control portion 11 receiving the object image data temporarily holds the object image data in the buffer 17. Subsequently, the photographing portion 12 continuously photographs the chart 60 until a photographing end signal for giving an instruction for ending the photographing operation is received from the control portion 11.

When the photographing portion 12 acquires the object image data, the MTF calculating portion 13 calculates an MTF based on the object image data thus acquired and preset measuring position data, thereby obtaining MTF data (Step S3). In this case, the MTF calculating portion 13 calculates the respective MTFs in five parts by setting, as targets, the L-shaped marks in the five parts printed on the chart 60 (see FIG. 3), thereby acquiring five MTF data. Then, the respective MTF data thus acquired are output to the control portion 11. The control portion 11 receiving the MTF data temporarily holds the MTF data in the buffer 17.

When the MTF calculating portion 13 acquires the MTF data, the MTF curve image generating portion 14 generates MTF curve image data in which an axis of abscissas indicates a spatial frequency and an axis of ordinates indicates a value of a contrast based on the MTF data thus acquired (Step S4). In the first embodiment, the MTF curve image generating portion 14 generates five MTF curve image data corresponding to the five MTF data acquired by the MTF calculating portion 13.

When the MTF curve image generating portion 14 generates the MTF curve image data, the measuring result screen generating portion 15 generates measuring result screen data indicative of respective MTF curve images corresponding to measuring positions on an object image together with the object image based on the object image data held temporarily in the buffer 17 and the five MTF curve image data (Step S5).

When the measuring result screen generating portion 15 generates the measuring result screen data, the control portion 11 outputs, to the transmitting portion 16, the measuring result screen data thus generated and the five MTF data held temporarily in the buffer 17. Upon receipt of the measuring result screen data and the five MTF data, the transmitting portion 16 transmits the measuring result screen data to the display device 20 and transmits the five MTF data to the information processing device 30 (Step S6).

Every time the measuring result screen generating portion 15 generates the measuring result screen data, consequently, the MTF measuring unit 10 transmits the measuring result screen data thus generated to the display device 20 until the operation for photographing the chart 60 through the photographing portion 12 is ended. Every time the MTF calculating portion 13 acquires the MTF data, moreover, the MTF data thus acquired are transmitted to the information processing device 30.

Figure 5:
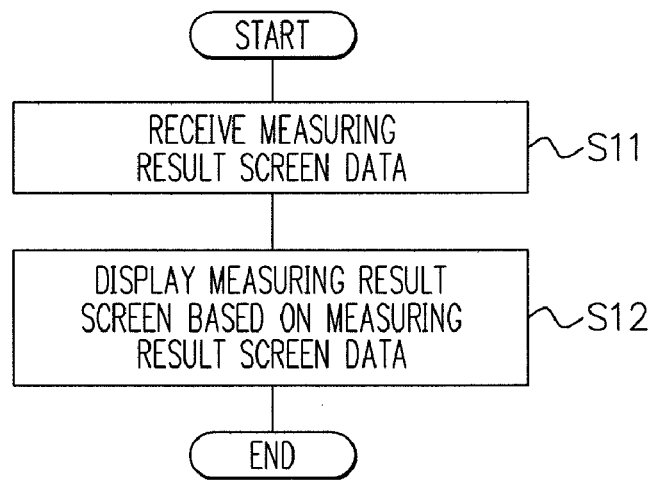
FIG. 5 is a flowchart showing an example of an operation to be carried out until a display device according to the first embodiment displays a measuring result screen.

Next, description will be given to an operation to be carried out until the display device 20 displays the measuring result screen. FIG. 5 is a flowchart showing an example of the operation to be carried out until the display device 20 displays the measuring result screen. In FIG. 5, when the receiving portion 21 of the display device 20 receives the measuring result screen data from the MTF measuring unit 10 (Step S11), the display control portion 22 displays, on the display portion 23, a measuring result screen indicative of the respective MTF curve images corresponding to the positions (the central part and the peripheral parts thereof) over the object image in which the MTF is measured together with the object image as shown in FIG. 6 based on the measuring result screen data which are received (Step S12).

Figure 7:
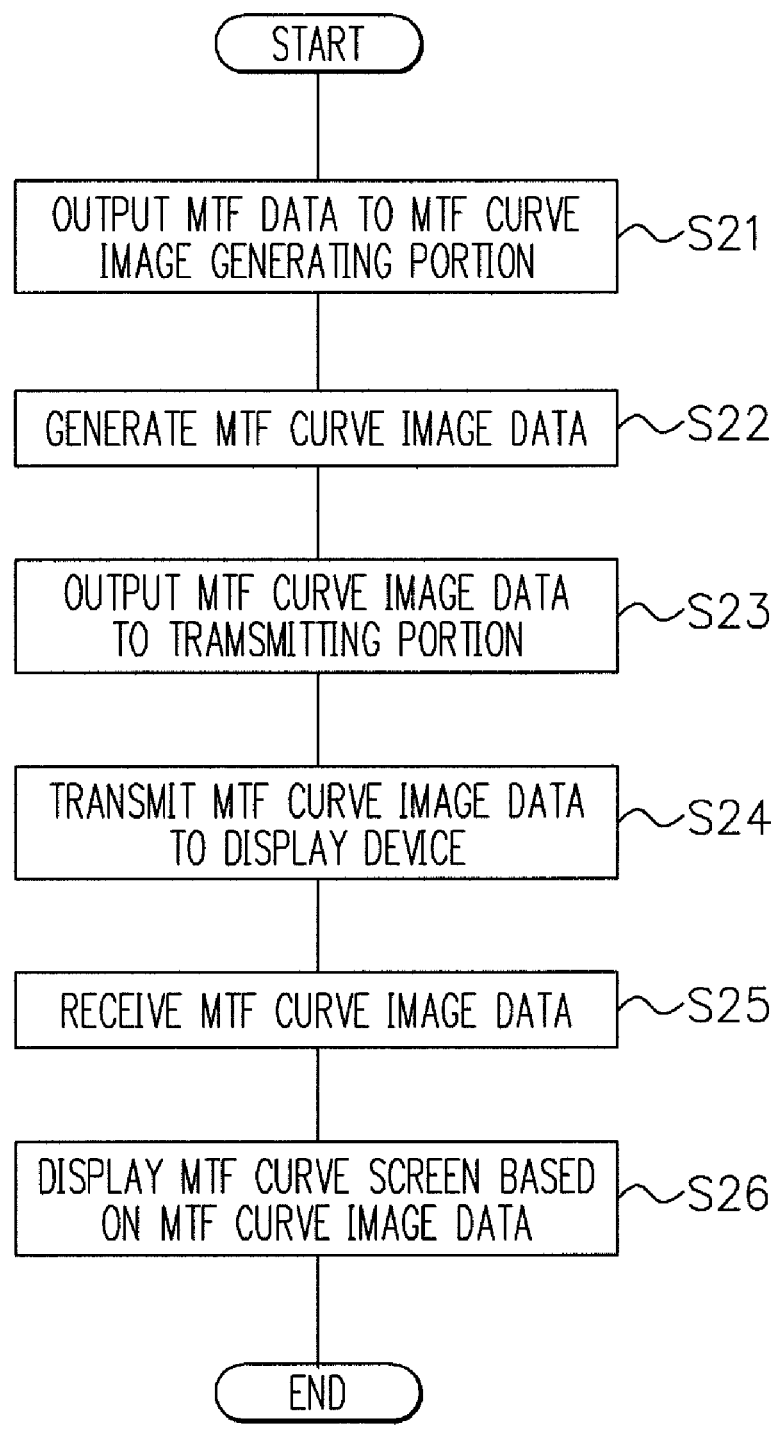
FIG. 7 is a flowchart showing an example of an operation to be carried out until the display device according to the first embodiment displays an MTF curve screen.

Next, description will be given to an operation to be carried out until the display device 40 displays the MTF curve screen. FIG. 7 is a flowchart showing an example of the operation to be carried out until the display device 40 displays the MTF curve screen. In FIG. 7, when the receiving portion 32 of the information processing device 30 receives the five MTF data from the MTF measuring unit 10, the control portion 31 outputs the five MTF data to the MTF curve image generating portion 33 (Step S21). Upon receipt of the five MTF data, the MTF curve image generating portion 33 generates five MTF curve image data in which an axis of abscissas indicates a spatial frequency and an axis of ordinates indicates a value of a contrast based on the respective MTF data (Step S22).

When the MTF curve image generating portion 33 generates the five MTF curve image data, the control portion 31 outputs, to the transmitting portion 34, the five MTF curve image data thus generated (Step S23). Upon receipt of the five MTF curve image data from the control portion 31, the transmitting portion 34 transmits the five MTF curve image data to the display device 40 (Step S24). When the receiving portion 41 of the display device 40 receives the five MTF curve image data (Step S25), the display control portion 42 causes the display portion 43 to display the MTF curve screen indicative of the respective MTF curve images in the positions (the central part and the four peripheral parts thereof) in which the MTF is measured as shown in FIG. 8 based on the five MTF curve image data which are received (Step S26).

As described above in detail, in the MTF measuring system 100 according to the first embodiment, the display device 20 is caused to display the measuring result screen indicative of the object image and the MTF curve image. In the work for evaluating and measuring the performance of the lens 50, therefore, the measuring result screen indicative of the MTF curve image is displayed together with the object image on the display device 20 in a real time. Consequently, the user can grasp the necessity of focusing from the MTF curve image of the measuring result screen to carry out focusing if necessary, and at the same time, can also evaluate the lens performance. Accordingly, it is possible to enhance an efficiency of the work for evaluating and measuring the lens performance.

In the first embodiment, moreover, the display device 20 is caused to display the measuring result screen in which the markers are printed in the central part of the chart 60 and the four peripheral parts thereof to set the measuring positions of the MTF and the respective MTF curve images are shown in the measuring positions. Consequently, the user can intuitively grasp, from the measuring result screen, any of the measuring positions in which the displayed MTF curve image is placed. Moreover, it is possible to grasp any of parts which requires the focusing from the MTF curve images in the parts. For example, in the case in which the photographing portion 12 is not disposed perpendicularly to the chart 60 even if the position of the chart 60 is correct, the MTF curve images in the parts are not uniform. Accordingly, the user can grasp the necessity of the focusing in the peripheral parts of the image photographed through the lens 50 in addition to the central part thereof and can adjust the focus of the object image displayed together with the MTF curve image in more detail if necessary.

Although the measuring result screen shows the object image and the MTF curve images in the parts (the central part of the chart 60 and the four peripheral parts thereof) respectively in the embodiment, this is not restricted. For example, it is also possible to employ a structure in which a luminance level of a white region in the vicinity of the L-shaped mark projected onto the preset measuring positions (for example, the central part of the chart 60 and the four peripheral parts thereof) over the object image is calculated and a luminance level image indicative of the luminance level thus calculated is also included in the measuring result screen and is displayed thereon.

Figure 9:
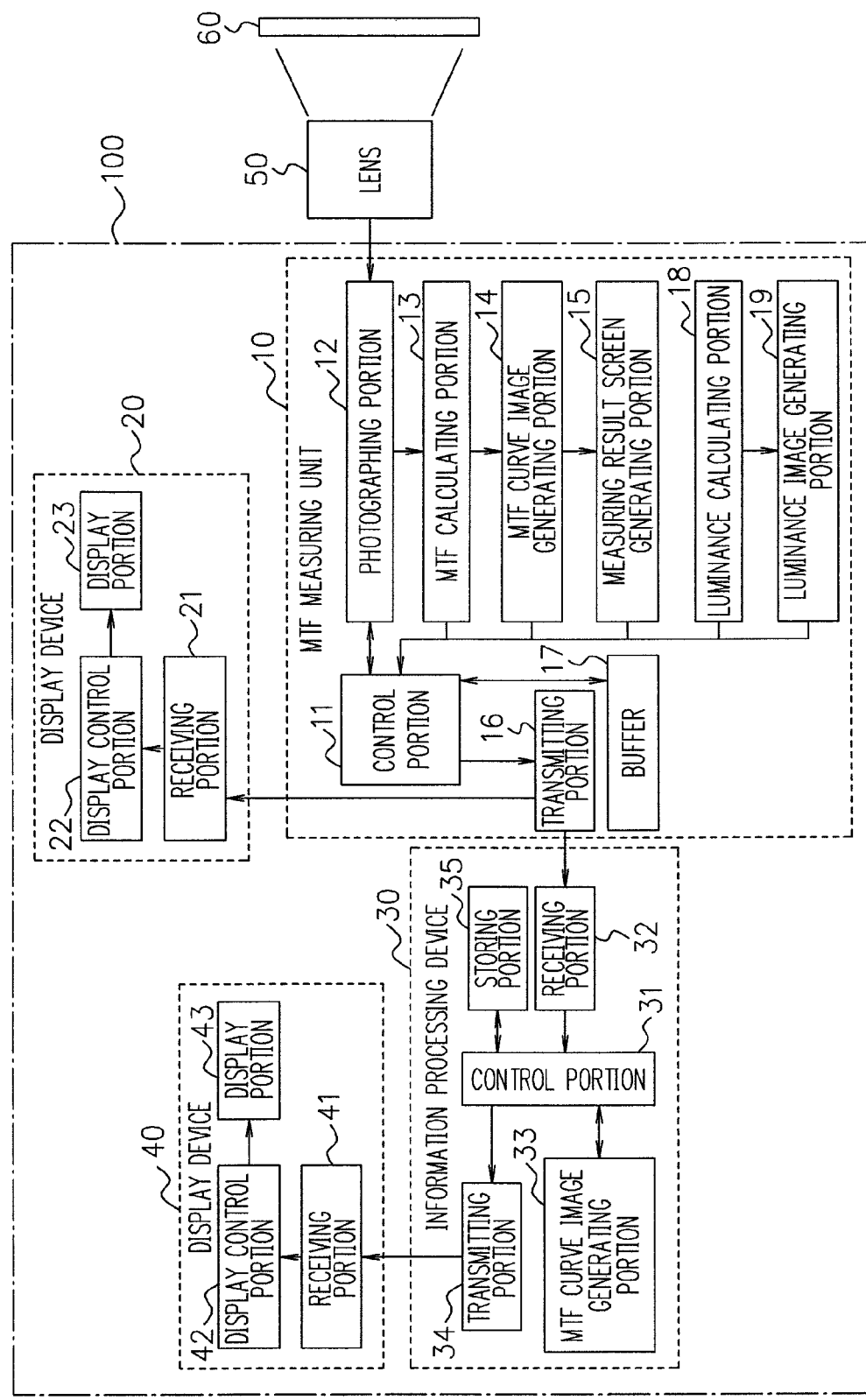
FIG. 9 is a block diagram showing another example of the functional structure of the MTF measuring system according to the first embodiment.

More specifically, for example, the MTF measuring unit 10 of the MTF measuring system 100 according to the first embodiment includes a luminance calculating portion 18 and a luminance image generating portion 19 in addition to the functional structure according to the first embodiment as shown in FIG. 9. When the photographing portion 12 acquires the object image data, the luminance calculating portion 18 calculates the luminance level of the white region in the vicinity of the L-shaped marks in the preset measuring positions (for example, the central part of the chart 60 and the four peripheral parts thereof) in the object image data thus acquired, and obtains five luminance level data indicative of the luminance levels thus calculated. The control portion 11 temporarily holds, in the buffer 17, the respective luminance level data which are obtained.

When the luminance calculating portion 18 acquires the five luminance level data, the luminance image generating portion 19 generates the luminance level image data indicative of the luminance levels of the white region in the vicinity of the L-shaped marks in the measuring positions (for example, the central part of the chart 60 and the four peripheral parts thereof) based on the five luminance level data which are acquired, respectively. The control portion 11 temporarily holds, in the buffer 17, the respective luminance level image data thus generated. The measuring result screen generating portion 15 generates the measuring result screen data indicative of the MTF curve images and the luminance level images which correspond to the measuring positions over the object image together with the object image based on the object image data, the five MTF curve image data and the five luminance level image data held temporarily in the buffer 17, and transmits the measuring result screen data to the display device 20.

Figure 10:
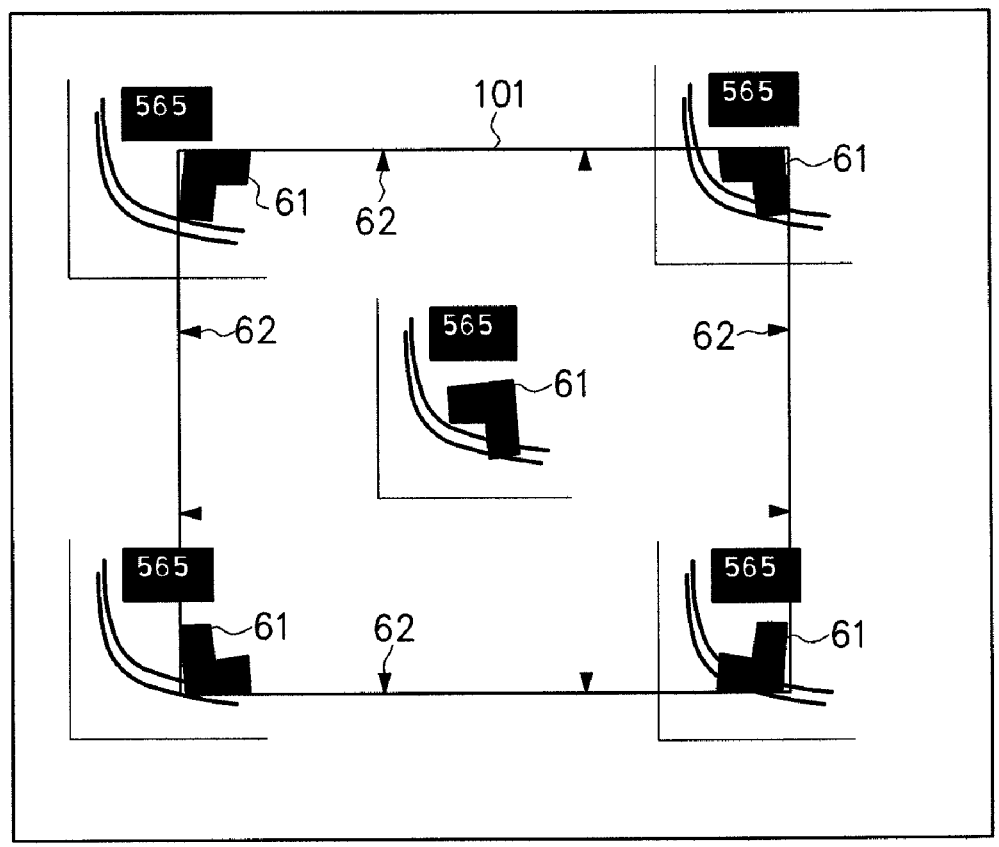
FIG. 10 is a view showing another example of the measuring result screen according to the first embodiment.

By calculating the luminance levels for the white region in the vicinity of the L-shaped marks in the five parts (the central part of the chart 60 and the four peripheral parts thereof) respectively, thus, the user can refer to the luminance level images in the respective measuring positions in the five parts (the central part of the chart 60 and the four peripheral parts thereof) through a measuring result screen (see FIG. 10). Accordingly, the user can grasp a saturation state of the luminances in the peripheral parts of the lens 50 in addition to the central part thereof depending on the luminance levels in the respective measuring positions, thereby carrying out the focusing in more detail.

Figure 11:
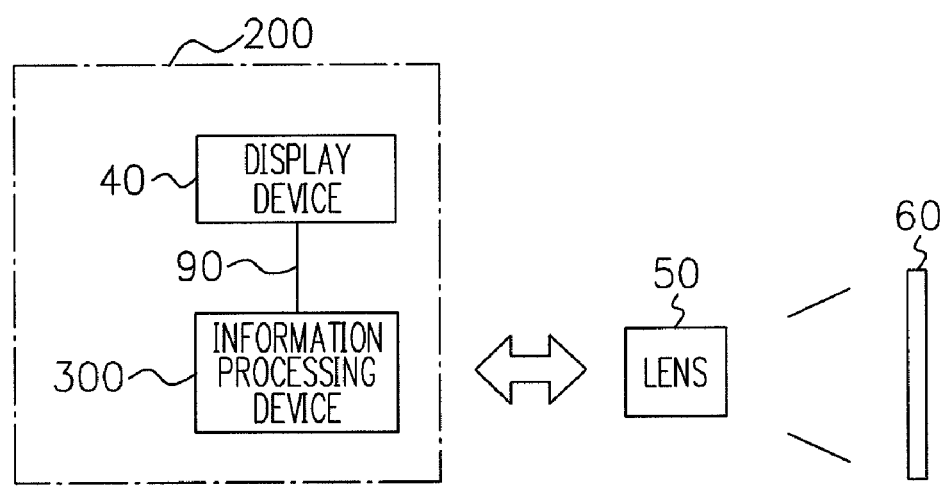
FIG. 11 is a diagram showing an example of a whole structure of an MTF measuring system according to the second embodiment.

Next, a second embodiment of an MTF measuring system according to the present invention will be described in detail with reference to the drawings. FIG. 11 is a diagram showing an example of a whole structure of an MTF measuring system 200 according to the second embodiment. As shown in FIG. 11, the MTF measuring system 200 according to the second embodiment includes an information processing device 300 and a display device 40.

The display device 40 is a video monitor constituted by a liquid crystal or the like, and displays a measuring result screen indicative of an object image and an MTF curve image as will be described below. The information processing device 300 is a PC for storing MTF data, controlling a display of the MTF curve image, or the like, and is connected to the display device 40 through a VGA cable 90.

Figure 12:
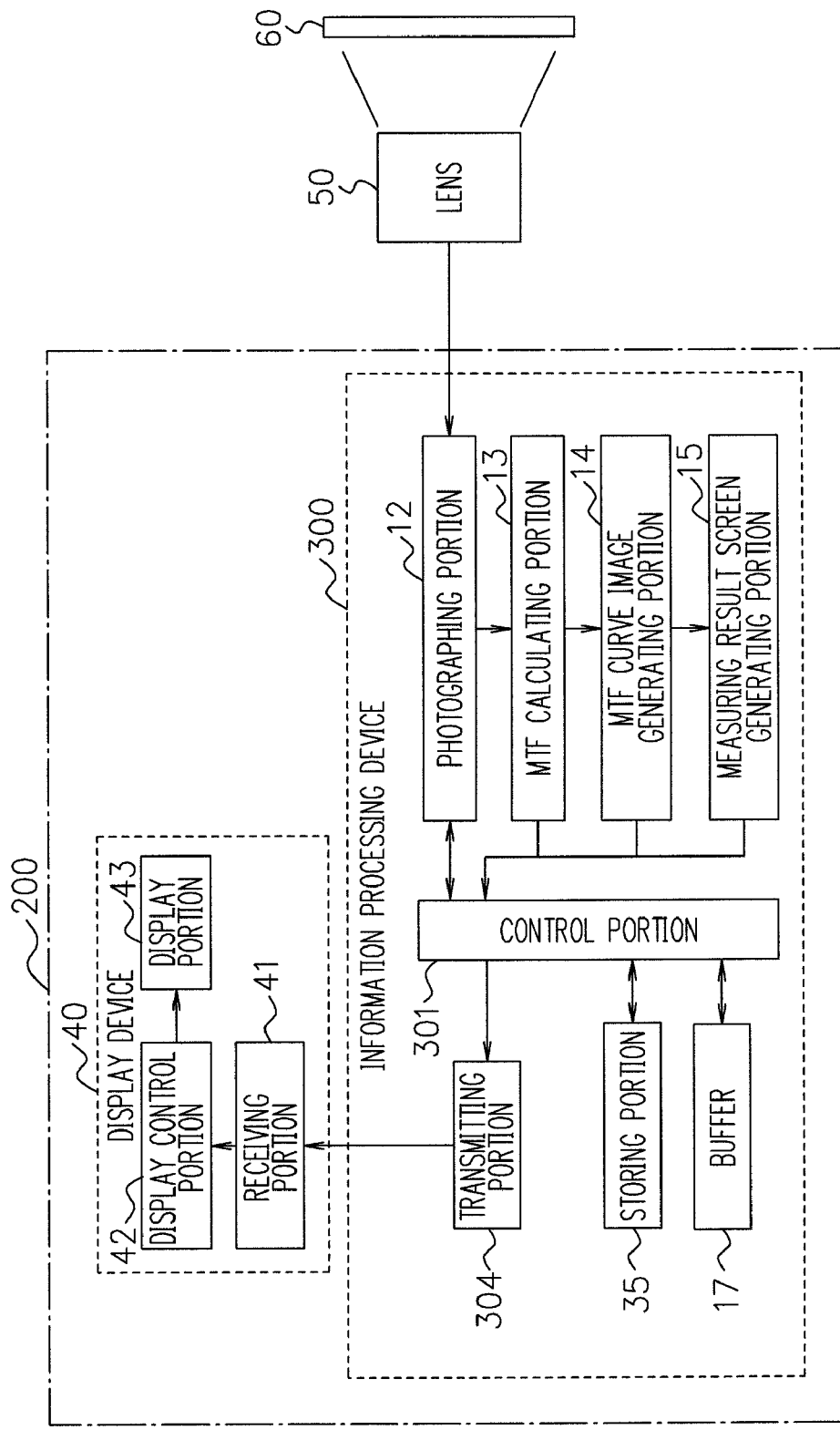
FIG. 12 is a block diagram showing an example of a functional structure of the MTF measuring system according to the second embodiment.

FIG. 12 is a block diagram showing an example of a functional structure of the MTF measuring system 200 according to the second embodiment. As shown in FIG. 12, the information processing device 300 includes a control portion 301, a photographing portion 12, an MTF calculating portion 13, an MTF curve image generating portion 14, a measuring result screen generating portion 15, a transmitting portion 304, a storing portion 35 and a buffer 17. Since the photographing portion 12, the MTF calculating portion 13, the MTF curve image generating portion 14, the measuring result screen generating portion 15, the storing portion 35 and the buffer 17 are the same as those in the first embodiment, description will be omitted.

The control portion 301 serves as a so-called CPU to generalize and control the information processing device 300. For example, upon receipt of an evaluating start signal for giving an instruction for starting to evaluate a lens performance from an input portion which is not shown or the like in order to evaluate the performance of the lens 50, the control portion 301 outputs a photographing start signal for giving an instruction for starting to photograph the chart 60 to the photographing portion 12. Moreover, the control portion 301 outputs, to the transmitting portion 304, measuring result screen data generated by the measuring result screen generating portion 15. Upon receipt of the measuring result screen data generated by the measuring result screen generating portion 15 from the control portion 301, the transmitting portion 304 transmits the measuring result screen data to the display device 40.

Figure 13:
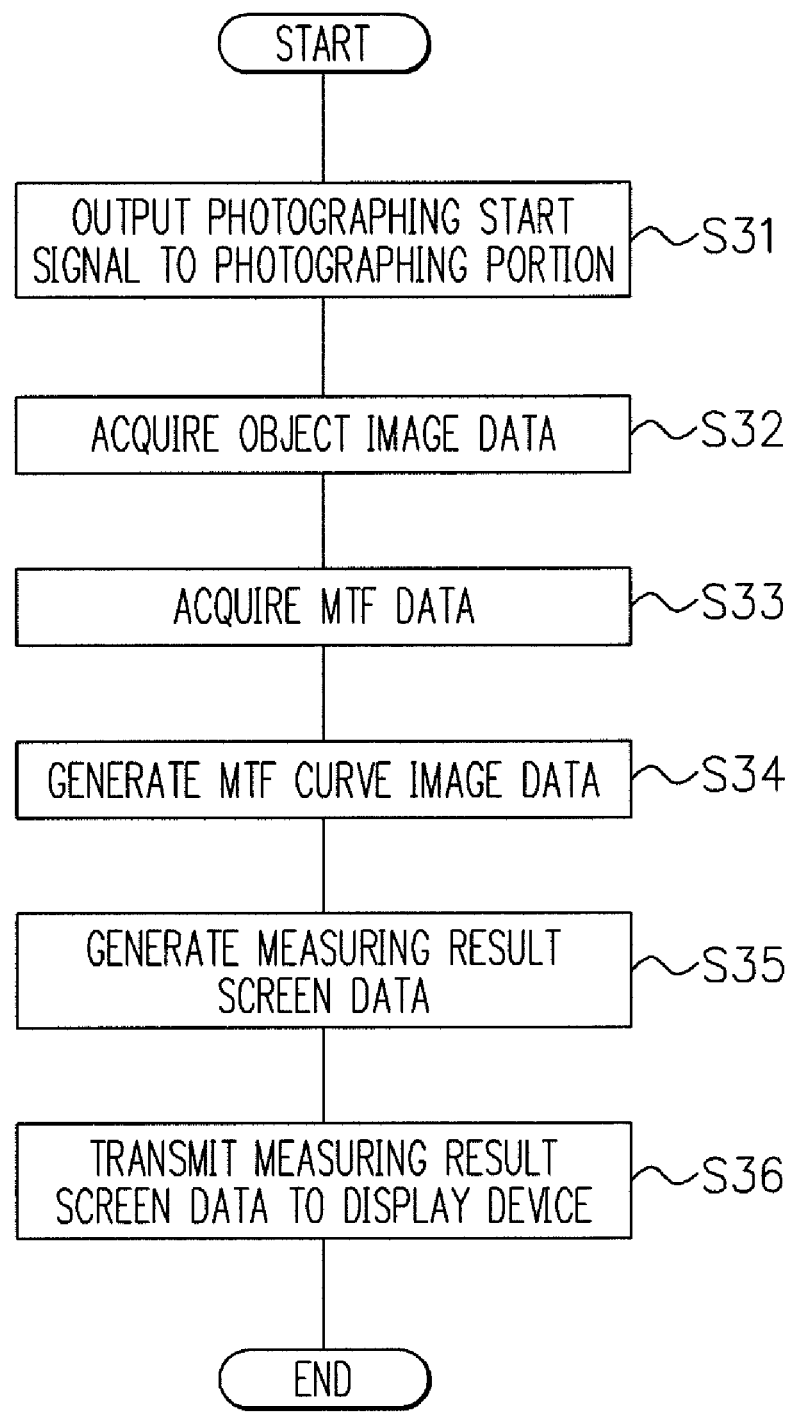
FIG. 13 is a flowchart showing an example of an operation of an information processing device according to the second embodiment.

Next, description will be given to an operation of the MTF measuring system 200 according to the second embodiment. First of all, description will be given to an operation to be carried out until the information processing device 300 transmits the measuring result screen data to the display device 40. FIG. 13 is a flowchart showing an example of an operation of the information processing device 300 according to the second embodiment. In FIG. 13, since Steps S31 to S35 are the same as the Steps S1 to S5 according to the first embodiment, description of the example of the operation will be omitted.

At the Step S35, when the measuring result screen generating portion 15 generates the measuring result screen data, the control portion 301 of the information processing device 300 outputs the measuring result screen data thus generated to the transmitting portion 304. Upon receipt of the measuring result screen data, the transmitting portion 304 transmits the measuring result screen data to the display device 40 (Step S36). Every time the measuring result screen generating portion 15 generates the measuring result screen data, thus, the information processing device 300 transmits the measuring result screen data thus generated to the display device 40 until the operation for photographing the chart 60 through the photographing portion 12 is ended.

Subsequently, the display device 40 is operated in the same manner as in the case in which the display device 20 according to the first embodiment displays the measuring result screen as shown in FIG. 5. More specifically, when the receiving portion 41 of the display device 40 receives the measuring result screen data from the information processing device 300, the display control portion 42 displays, on the display portion 43, the measuring result screen indicative of the MTF curve images corresponding to positions (a central part and peripheral parts thereof) over an object image in which the MTF is measured respectively together with the object image as shown in FIG. 6 based on the measuring result screen data which are received.

As described above in detail, according to the second embodiment, all necessary processings for displaying the measuring result screen in a real time are executed by the information processing device 300 in the work for evaluating and measuring a lens performance. Therefore, it is possible to obtain the same advantages as those in the first embodiment without providing the MTF measuring unit 10 separately.

Figure 14:
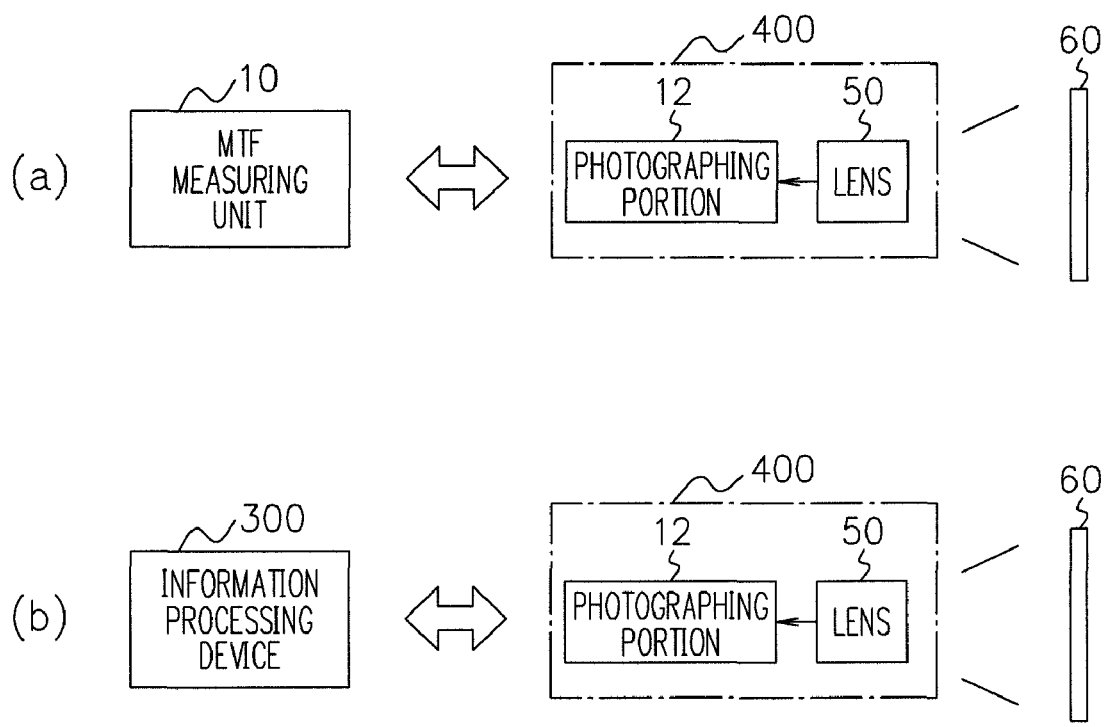
FIGS. 14(a) and 14(b) are block diagrams showing a variant of the MTF measuring system according to the present embodiment.

Although the MTF measuring unit 10 or the information processing device 300 includes the photographing portion 12 and the lens 50 can be attached and removed in the first and second embodiments, this is not restricted. For example, as shown in FIGS. 14(*a*) and (*b*), it is also possible to employ a structure in which a camera module 400 having the lens 50 and the photographing portion 12 integrated can be attached to or removed from the MTF measuring unit 10 or the information processing device 300. In this case, the photographing portion 12 is not present in the MTF measuring unit 10 or the information processing device 300. In the case in which such a structure is employed, a user can adjust the focus of the camera module 400 and evaluate the lens performance by referring to the object image of the measuring result screen, the respective MTF curve images corresponding to the measuring positions on the object image or the like in the same manner as described above.

Moreover, the MTF measuring method of the MTF measuring system according to the first and second embodiments described above can be implemented by a hardware structure, a DSP or software. For example, in the case in which the method is implemented in the software, the MTF measuring unit 10 or the information processing device 300 according to the second embodiment is actually constituted to include a CPU of a computer, an MPU, an RAM, an ROM or the like and a program stored in the RAM or the ROM is operated so that the method can be implemented.

In addition, it is possible to implement the method by recording, in a recording medium such as a CD-ROM, a program to be operated to fulfill the function according to the second embodiment by a computer and causing the computer to read the program. For the recording medium to record the program, it is possible to use a flexible disk, a hard disk, a magnetic tape, an optical disk, a magneto-optical disk, a DVD, a nonvolatile memory card or the like in addition to the CD-ROM. Furthermore, it is also possible to implement the method by downloading the program into the computer through a network such as Internet.

Also in the case in which a computer executes a supplied program so that the function according to the second embodiment is implemented, and furthermore, the function according to the second embodiment is implemented in cooperation with an OS (operating system) having the program operated in the computer, another application software or the like and the case in which all or a part of processings for the supplied program are carried out by an expansion board or an expansion unit for the computer so that the function according to the embodiment is implemented, the program is included in the embodiments according to the present invention.

In addition, all of the embodiments described above are only illustrative for a concreteness to carry out the present invention and the technical range of the present invention should not be construed to be restrictive by them. In other words, the present invention can be carried out in various forms without departing from the spirit or main features thereof.

INDUSTRIAL APPLICABILITY

The present invention is suitably used in a system for measuring an MTF representing, as a spatial frequency characteristic, an extent at which a contrast possessed by an object can be faithfully reproduced, and a method of measuring the same.

This application is based on Japanese Patent Application No. 2006-214437 filed on Aug. 7, 2006, the contents of which are incorporated hereinto by reference.

The invention claimed is:

1. An MTF measuring system for calculating an MTF to be an index for evaluating a lens performance by MTF calculating means to acquire MTF data based on object image data obtained by photographing an object through a lens, and generating MTF curve image data indicative of an MTF curve based on the MTF data thus acquired, comprising:

measuring result screen generating means for generating measuring result screen data indicative of an object image and an MTF curve image based on the object image data and the MTF curve image data; and display control means for displaying a measuring result screen on a display portion based on the measuring result screen data generated by the measuring result screen generating means;

wherein a plurality of markers taking a predetermined shape is printed on the object, the MTF calculating means calculates an MTF of each of the markers taking the predetermined shape in the object image data acquired by photographing the markers, thereby acquiring the MTF data in each marker position, and the measuring result screen generating means generates measuring result screen data having an MTF curve image in the marker position disposed in the vicinity of the marker position based on the MTF curve image data generated from the MTF data; and further comprising:

luminance calculating means for calculating a luminance level of a white region in the vicinity of each marker position in the object image data, thereby acquiring luminance level data indicative of the luminance level in the marker position; and luminance image generating means for generating luminance level image data indicative of a luminance level image of the white region in the vicinity of each marker position based on the luminance level data thus acquired, the measuring result screen generating means generating measuring result screen data indicative of each MTF curve image and each luminance level image which correspond to each marker position on the object image together with the object image based on the object image data, the MTF curve image data and the luminance level image data.

* * * * *